(12) United States Patent
Tokida et al.

(10) Patent No.: US 6,247,622 B1
(45) Date of Patent: Jun. 19, 2001

(54) ELECTRIC INJECTION APPARATUS

(75) Inventors: Satoru Tokida; Issei Yamaguchi; Masashi Suda, all of Nagano-ken (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 0 days.

(21) Appl. No.: 09/667,061

(22) Filed: Sep. 21, 2000

(30) Foreign Application Priority Data

Sep. 22, 1999 (JP) .................................................. 11-269498

(51) Int. Cl.[7] .................................................... B65D 88/54
(52) U.S. Cl. ............................................ 222/333; 222/413
(58) Field of Search ..................................... 222/333, 413

(56) References Cited

U.S. PATENT DOCUMENTS 4,187,961 * 2/1980 Voller ..................................... 222/333
4,708,268 * 11/1987 Wurtz ..................................... 222/413

* cited by examiner

Primary Examiner—Philippe Derakshani
(74) Attorney, Agent, or Firm—Weingarten, Schurgin, Gagnebin & Hayes LLP

(57) ABSTRACT

An electric injection apparatus comprising a hydraulic cylinder for back pressure control. The electric injection apparatus includes rear and front supports integrally coupled to each other by a tie bar with a predetermined spacing therebetween. A heating barrel having an injection screw arranged therein is attached to the front support. Between the supports, a screw thrust member having an injection screw rotatably coupled to its front center is movably arranged so that the tie bar penetrates therethrough. Besides, the cylinder in the hydraulic cylinder is isolated from the heating barrel. This eliminates thermal effects and allows stable back pressure control in long-hour use.

1 Claim, 2 Drawing Sheets

ELECTRIC INJECTION APPARATUS

BACKGROUND OF THE INVENTION

1. Field of the Invention

The present invention relates to an electric injection apparatus, and more particularly to an electric injection apparatus which carries out back pressure control in metering by means of hydraulic power.

2. Description of the Prior Art

There have been already known some electric injection apparatuses that carries out back pressure control by means of hydraulic pressure. One of the prior art is to couple the rear end of an injection screw to a piston in a cylinder formed at the center of a screw thrust member so that the backward force of the screw is controlled by hydraulic pressure. In such a conventional electric injection apparatus, the injection screw transfers heat to heat the hydraulic fluid in the cylinder easily. Therefore, long-hour use heats up the hydraulic fluid with viscosity decrease, causing a problem of variations in the set pressure. In addition, since the hydraulic cylinder is provided inside, the screw thrust member is troublesome to fabricate. Accordingly, there is also the problem of hard adoption for electric injection apparatuses of ordinary structure.

In another example of the prior art, hydraulic cylinders are arranged across the support and the screw thrust member of the injection apparatus to carry out backpressure control. The cylinders are integrated onto both sides of the screw thrust member, and their piston rods are coupled to the support. Therefore, as in the conventional apparatus described above, it is inevitable that the heat transfer through the injection screw thermally affects the hydraulic fluid in the cylinders. Besides, like the preceding prior art, there is the problem of hard adoption for electric injection apparatuses of ordinary structure.

SUMMARY OF THE INVENTION

The present invention has been achieved to solve the foregoing conventional problems, and an object thereof is to provide an electric injection apparatus in which an independent hydraulic cylinder for back pressure control can be arranged without adding any special means to a screw thrust member. Another object of the present invention is to provide an electric injection apparatus having a cylinder that can be spaced away from a heater barrel to eliminate the thermal effects on the hydraulic fluid. Still another object of the present invention is to provide an electric injection apparatus of new configuration in which a hydraulic block can be incorporated according to need so that valve devices as well as a cylinder are installed on a rear support.

To achieve the foregoing objects, the present invention provides an electric injection apparatus comprising a hydraulic cylinder for back pressure control. This electric injection apparatus includes rear and front supports integrally coupled to each other by a tie bar with a predetermined spacing therebetween. A heating barrel having an injection screw arranged therein is attached to the front support. Between the supports, a screw thrust member having an injection screw rotatably coupled to its front center is movably arranged so that the tie bar penetrates therethrough. Besides, the rear support and the screw thrust member are coupled to each other by means of the threaded engagement between a ball screw shaft and a ball nut portion. The hydraulic cylinder for back pressure control is arranged across the rear support and the screw thrust member, in parallel with the ball screw shaft so that its cylinder and piston rod are fixed to the rear-support side and the screw-thrust-member side, respectively. The ball screw shaft and the injection screw are driven by electric driving means.

Such an electric injection apparatus has servomotors as drive sources, whereas the back pressure control in metering is performed by means of hydraulic power. This means a higher precision as compared with the cases where the back pressure control is carried out through servomotor rotation controls. Moreover, the cylinder of the hydraulic cylinder for back pressure control is fixed to the rear-support side isolated away from the heating barrel. This avoids easy heat transfer from the heating barrel to the cylinder, eliminating the resulting thermal effects on the hydraulic fluid in the cylinder. Therefore, stable back pressure control can be maintained even in long-hour use.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENT

Figure 1:
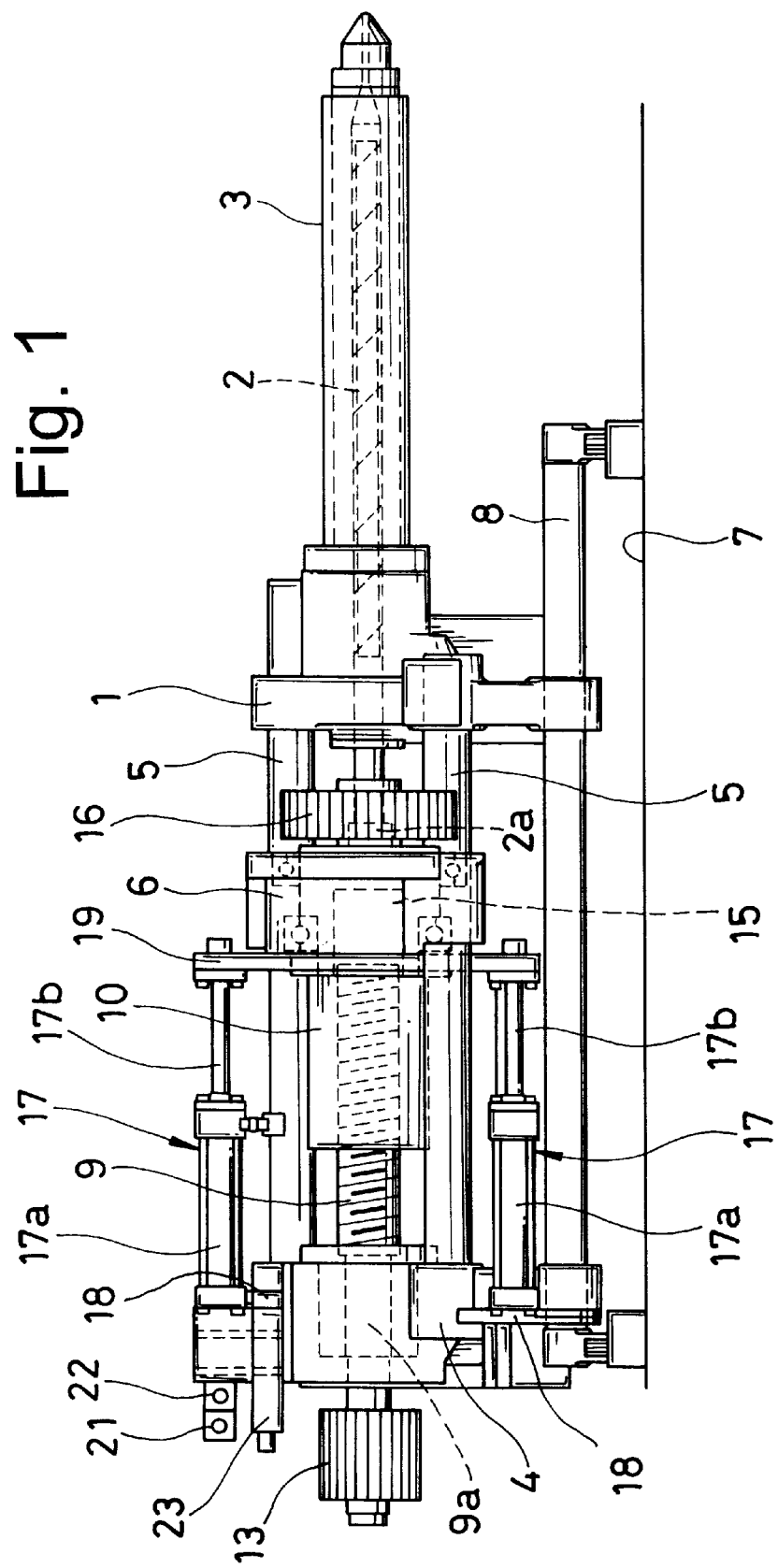
FIG. 1 is a side view of an electric injection apparatus according to the present invention.
Figure 2:
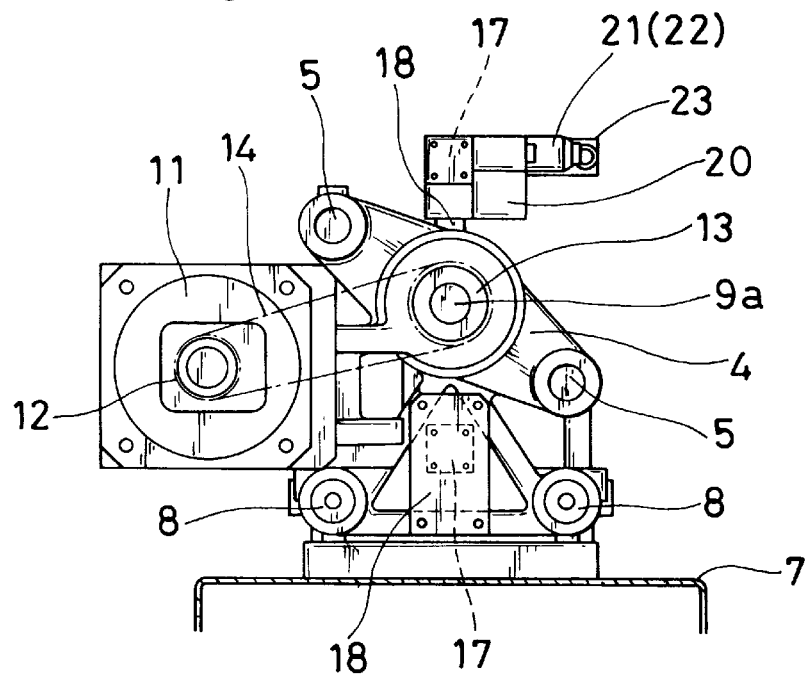
FIG. 2 is a rear view of the electric injection apparatus according to the present invention.

Hereinafter, the present invention will be described in detail with reference to the accompanying drawings, whereas the present invention is not limited thereto.

In the drawings, the reference numeral 1 represents a front support of an injection apparatus. A heater barrel 3 having an injection screw 2 rotatably arranged inside is mounted on the front face of the front support 1. The numeral 4 represents a rear support. The front support 1 and the rear support 4 are integrally coupled to each other with a predetermined spacing therebetween via at least a pair of tie bars 5. Between the supports, a screw thrust member 6 is movably arranged so that the tie bars 5 penetrate therethrough. The numeral 7 represents a base, on the top face of which a pair of spindles 8 are longitudinally arranged in parallel. The spindles 8 penetrate through both the supports 1 and 4 at the respective lower side portions so that the supports 1 and 4 are movably arranged erect over the base.

A ball screw shaft 9 is fixed to the front face of the rear support 4. A shank 9a of the ball screw shaft 9 is rotatably supported through the center of the rear support 4. A ball nut portion 10 is protruded from the rear center of the screw thrust member 6. The threaded engagement between the boll screw shaft 9 and the ball nut portion 10 links the rear support 4 and the screw thrust member 6 to each other. An injecting servomotor 11 is installed on a side of the rear support 4. Wound around a pulley 12 of the servomotor and a pulley 13 on the end of the ball screw shaft 9 is a timing belt 14, through which rotational power is transferred to the ball screw shaft 9. The ball nut portion 10 and the tie bars 5 convert rotation of the ball screw shaft 9 into linear motion, whereby the screw thrust member 6 moves forward.

The injection screw 2 is rotatably coupled to the front center of the screw thrust member 6, and is joined at its shank rear end 2a to a hollow rotating cylinder 15 in the screw thrust member 6. Thereby, the injection screw 2 can advance and retreat with the screw thrust member 6 to perform resin metering and injection.

The numeral 16 represents a pulley for screw rotation, which is integrally attached to the shank of the injection screw 2 by fitting. Though omitted from the drawings, a timing belt is wound around this pulley 16 and a pulley of a metering servomotor that is installed on a side of the screw thrust member 6. Thereby, the metering servomotor can rotate the screw to plasticate resin.

The numerals 17 represent a pair of hydraulic cylinders for back pressure control. Retention plates 18 are arranged over and under the rear support 4, and a retention plate 19 is fitted to the bottom of the ball nut portion 10 on the screw thrust member 6. The hydraulic cylinders 17 are arranged across the rear support 4 and the screw thrust member 6, in parallel with the ball screw shaft 9 so that their cylinders 17a and piston rods 17b are fixed to the retention plates 18 and the retention plate 19, respectively.

On the top of the rear support 4 is provided a hydraulic block 20. A required number of switching valves 21, 22 and relief valve 23 are installed on the hydraulic block 20 so that the back pressure control in metering can be carried out by means of hydraulic pressure.

In the electric injection apparatus having the above-described configuration, the injection screw 2 completes an injection at its foremost position when the screw thrust force is removed and the injection pressure is released before the screw is rotated to plasticate and meter resin at the same time. Here, the metering servomotor is actuated to make the screw rotations via the pulley 16. The screw rotations and the heating from the heating barrel 3 plasticate resin, so that the resin plasticated is fed into the front portion of the heating barrel 3 for metering.

Here, the injection screw 2 is moved backward by the resin pressure. If the injection screw 2 is under no thrust force, the resin pressure may fluctuate to make the metering density unsteady. Therefore, a predetermined back pressure is applied to the injection screw 2 so that the retreat is made under a set pressure. This back pressure is produced by the hydraulic forces from the hydraulic cylinders 17, controlled by the relief valve 23. That is, the screw retreat will occur under resin pressures exceeding the back pressure applied to the injection screw 2.

When the electric injection apparatus having servomotors as the injecting and metering drive sources carries out its back pressure control by using the hydraulic cylinders 17 as described above, the hydraulic cylinders 17 directly receive the retreating force of the injection screw 2 resulting from the resin pressure. This allows back pressure controls with higher fidelity to the set pressure as compared with the conventional cases where the resin pressure is indirectly detected through pressure monitoring by a sensor and then servomotor rotations are electrically controlled for back pressure control.

In the hydraulic cylinders 17 of such arrangement, the piston rods 17b are coupled to the retention plate 19 on the screw-thrust-member-6 side. Due to this, the screw thrust member 6, when moving except in metering, can make the piston rods 17b extend or contract to produce resistance against the movement of the screw thrust member 6. Nevertheless, this problem can be solved by valve operations, combined with the provision of a hydraulic circuit as shown in FIG. 3.

Figure 3:
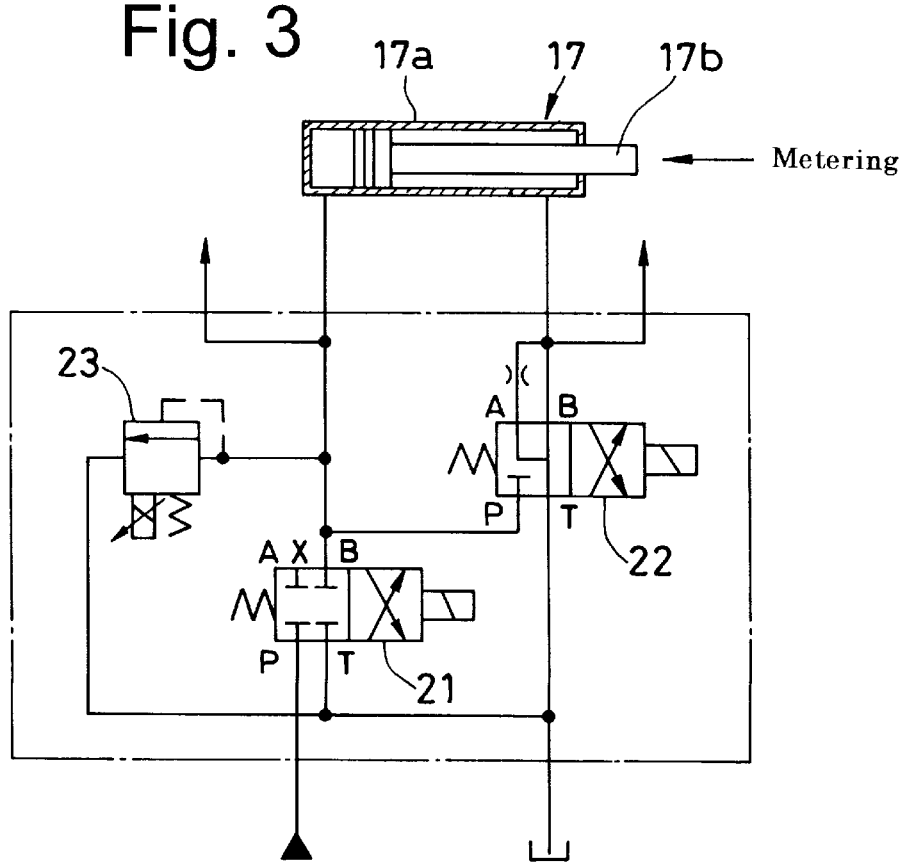
FIG. 3 is a diagram showing a hydraulic circuit for hydraulic cylinders to be used in the electric injection apparatus according to the present invention.

In the hydraulic circuit of FIG. 3, the numerals 21 and 22 represent switching valves, and the numeral 23 a relief valve. For example, the following operations allows the hydraulic cylinders 17 to be used only for back pressure control. That is, the switching valves 21 and 22 are turned ON at the beginning of and during an injection. In injection pressure release, the switching valve 22 is kept ON and the switching valve 21 is turned OFF. At the beginning of and during metering, the switching valves 21 and 22 are turned OFF. In decompression, the switching valve 22 is turned ON.

As has been described above, according to the present invention, the back pressure control in an electric injection apparatus is performed by means of hydraulic pressure. This carries out control of higher precision as compared with the cases where the back pressure control is carried out by monitoring the pressure detected by a pressure sensor and controlling servomotor rotations. Moreover, the hydraulic cylinders 17 have only to be arranged across the rear support 4 and the screw thrust member 6 to load hydraulic resistance onto the retreating force of the screw thrust member 6via the piston rods 17b, causing no significant increase in structural complexity. This allows immediate application to electric injection apparatuses of ordinary structure without any modification to the configuration of their screw thrust members 6. Furthermore, the cylinders 17a are coupled to the rear support 4, and thereby isolated from the heating barrel 3. This eliminates the thermal effects on the hydraulic fluid in the cylinders 17a, whereby the back pressure control can be carried out with no change in the set pressure even in long-hour use.

While the presently preferred embodiment of the present invention has been shown and described, it will be understood that the present invention is not limited thereto, and that various changes and modifications may be made by those skilled in the art without departing from the scope of the invention as set forth in the appended claims.

What is claimed is:

1. An electric injection apparatus comprising:

a rear support;

a front support coupled by a tie bar to said rear support at a predetermined spacing;

a heating barrel attached to said front support;

an injection screw to be arranged inside said heating barrel;

a screw thrust member movably arranged between said rear support and said front support, an end of said injection screw being rotatably coupled to a front center of said screw thrust member, said tie bar penetrating through said screw thrust member;

a ball screw shaft and a ball nut portion for establishing threaded coupling between said rear support and said screw thrust member;

a hydraulic cylinder for back pressure control arranged across said rear support and said screw thrust member in parallel with said ball screw shaft, said hydraulic cylinder including a cylinder to be fixed to the rear-support side and a piston rot to be fixed to the screw-thrust-member side;

electric driving means for driving said ball screw shaft; and electric driving means for driving said injection screw.

* * * * *

UNITED STATES PATENT AND TRADEMARK OFFICE
CERTIFICATE OF CORRECTION

PATENT NO. : 6,247,622 B1  
DATED : June 19, 2001  
INVENTOR(S) : Satoru Tokida et al.

It is certified that error appears in the above-identified patent and that said Letters Patent is hereby corrected as shown below:

Column 4,
Line 21, "6via" should read -- 6 via --.

Signed and Sealed this

Eleventh Day of June, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

| | |
|---|---|
| PATENT NO. | : 6,247,622 B1 |
| APPLICATION NO. | : 09/667061 |
| DATED | : June 19, 2001 |
| INVENTOR(S) | : Satoru Tokida et al. |

It is certified that error appears in the above-identified patent and that said Letters Patent is hereby corrected as shown below:

Title page, (57) Abstract, please delete the following:

"An electric injection apparatus comprising a hydraulic cylinder for back pressure control. The electric injection apparatus includes rear and front supports integrally coupled to each other by a tie bar with a predetermined spacing therebetween. A heating barrel having an injection screw arranged therein is attached to the front support. Between the supports, a screw thrust member having an injection screw rotatably coupled to its front center is movably arranged so that the tie bar penetrates therethrough. Besides, the cylinder in the hydraulic cylinder is isolated from the heating barrel. This eliminates thermal effects and allows stable back pressure control in long-hour use."

Title page, (57) Abstract, please insert the following new paragraph:

--An electric injection apparatus having front and rear supports coupled by a tie bar and having a movable screw thrust member therebetween; a heating barrel attached to said front support; an injection screw for arrangement inside said barrel; an injection screw end rotatably coupled to a front center of said thrust member with said tie bar penetrating therethrough; a ball screw shaft nut portion for threaded coupling between said rear support and said thrust member; a hydraulic cylinder for back pressure control across said rear support thrust member in parallel with said ball screw shaft, said hydraulic cylinder including a cylinder for attachment to the rear support side and a piston rod for attachment to a screw thrust member side; means for driving said ball screw shaft; and means for driving said injection screw.--

Column 4, line 21, "6via" should read --6 via--.

Signed and Sealed this

Twenty-sixth Day of February, 2008

JON W. DUDAS
*Director of the United States Patent and Trademark Office*